United States Patent [19]

Thanos

[11] Patent Number: 4,653,946
[45] Date of Patent: Mar. 31, 1987

[54] ADAPTIVE ELECTRONIC CONTROL SYSTEM FOR FORMED CHARACTER PRINTER

[75] Inventor: William N. Thanos, San Jose, Calif.

[73] Assignee: Qume Corporation, San Jose, Calif.

[21] Appl. No.: 703,258

[22] Filed: Feb. 20, 1985

[51] Int. Cl.⁴ .............................................. B41J 1/30
[52] U.S. Cl. .............................. 400/144.2; 101/93.19; 400/322
[58] Field of Search .................. 400/144.2, 144.3, 320, 400/322; 101/93.19

[56] References Cited

U.S. PATENT DOCUMENTS

| | | | |
|---|---|---|---|
| 4,030,591 | 6/1977 | Martin | 400/144.2 |
| 4,044,880 | 8/1977 | Martin | 400/144.3 X |
| 4,101,006 | 7/1978 | Jensen | 400/144.3 |
| 4,251,161 | 2/1981 | Cresti | 400/144.2 |

FOREIGN PATENT DOCUMENTS

| | | | |
|---|---|---|---|
| 54-110013 | 8/1979 | Japan | 400/322 |
| 59-109378 | 6/1984 | Japan | 400/322 |

Primary Examiner—Paul J. Sewell
Attorney, Agent, or Firm—T. L. Peterson; J. M. May

[57] ABSTRACT

A nominal carriage velocity profile is initiated during each carriage positioning interval which enables the carriage to be decelerated and stopped at the proper position for printing. However, the carriage velocity profile can be modified during the positioning interval to avoid decelerating if printing can occur on the fly; i.e., if the print element (and ribbon) are able to complete any necessary positioning by the time the carriage arrives at its printing position. In accordance with the preferred embodiment, the slave microprocessor produces a READY signal in advance of the print wheel arriving at its destination orientation. The READY signal indicates that both the print wheel and ribbon will reach their destinations and be ready for printing within a fixed time interval; e.g., three milliseconds. In response to the READY signal, the master microprocessor inhibits further adjustments in the carriage speed and permits the carriage to assume a "fly" mode. Additionally, from known carriage position and velocity information, the master microprocessor determines the time at which the carriage will pass through the printing position and when the hammer is to be fired.

14 Claims, 7 Drawing Figures

ADAPTIVE ELECTRONIC CONTROL SYSTEM FOR FORMED CHARACTER PRINTER

BACKGROUND OF THE INVENTION

This invention relates to serial printers which use a formed character print element (e.g., rotatable print wheel) and more particularly to an improved electronic control system thereof which yields greater mechanical reliability, lower energy usage, lower vibration and acoustic noise, and faster printing.

Serial formed character printers generally use a print wheel (such as a so-called "daisy wheel") mounted on a carriage. The carriage is mounted for linear movement along a line to be printed. The print wheel is mounted for rotation to enable different characters to move sequentially past a print hammer. In typical operation, a carriage motor is controlled to step the carriage in an incremental fashion, stopping at each character position to be printed. A print wheel motor is controlled to rotate the print wheel concurrently with the carriage movement to position a selected character adjacent the hammer. When both the carriage and print wheel come to rest at their desired destination positions, the hammer is fired to print the character. The carriage and print wheel can then be repositioned to print the next character.

The carriage and print wheel motors may be operated open loop if stepper motors are used but more typically, for higher speed operation, servo motors are employed and separate carriage and print wheel servo loops are utilized.

It has been recognized that the repeated starting and stopping of the carriage (which typically weighs about two pounds) using the maximum practical acceleration and deceleration produces high mechanical stresses and wear which can cause reliability problems in high speed printers. Moreover, the necessity to accelerate from rest to some maximum velocity, and then to decelerate back to rest, limits the speed at which the printer can operate.

In view of the foregoing, the present invention is directed to an improved printer control system capable of adaptively controlling the carriage speed during each carriage positioning interval to thereby permit printing without stopping the carriage, i.e., "on the fly."

DESCRIPTION OF THE PRIOR ART

Various prior art patents disclose techniques intended to enable serial printers to print on the fly. For example, see U.S. Pat. No. 4,101,006 (Jensen) which discloses a system in which the carrier speed can be slowed to a predefined slow speed to permit the print element to set up before the carrier reaches the print position. The carrier is then speeded up to move past the print position at a predefined nominal speed. The carrier is driven by a stepper motor, whose velocity is established by drive pulses obtained from an oscillator, in accordance with selected acceleration and deceleration profiles. Print hammer firing is determined by counting stepper motor steps until the proper carrier displacement has been achieved, since the printhead is always travelling at its normal velocity when the hammer is to be fired.

Various other patents disclose systems for selecting a carrier speed to accommodate print element set up time including: U.S. Pat. No. 4,178,108 and U.S. Pat. No. 4,189,246.

SUMMARY OF THE INVENTION

The present invention is directed to an improved printer control system for adapting the speed of the printer carriage to accommodate the variable time required to orient a print element.

It should be recognized that each time a character is to be printed, the carriage must be moved a certain distance, typically, but not necessarily, one full character unit, and that the time interval required for the carriage to move that distance, depends upon the carriage velocity.

In accordance with the present invention, a nominal non-constant carriage velocity profile is initiated during each carriage positioning interval which enables the carriage to be decelerated and stopped at the proper position for printing. However, in accordance with a significant feature of the invention, the carriage velocity profile can be modified to a constant velocity profile during the positioning interval to avoid unneeded deceleration if printing can occur on the fly; i.e., if the print element (and ribbon) are able to complete any necessary positioning by the time the carriage arrives at its printing position.

In accordance with a further significant feature of the invention, the carriage velocity profile is modified in response to a READY signal which is produced a certain predetermined interval (which may be expressed in units of time) in advance of the print element (and ribbon) arriving at its destination orientation.

A printer control system in accordance with the preferred embodiment includes both a carriage servo loop and a print element servo loop. The carriage servo loop includes a servo circuit controlled by a first microprocessor (master), and the print element servo loop includes a servo circuit controlled by a second microprocessor (slave).

In accordance with the preferred embodiment, the slave microprocessor produces a READY signal in advance of the print element (hereinafter, "wheel") arriving at its destination orientation. The READY signal indicates that both the print wheel and ribbon should reach their destinations and be ready for printing within a fixed time interval, e.g., three milliseconds. In response to the timely receipt of the READY signal, the master microprocessor inhibits further adjustments in the carriage speed and then permits the carriage to assume a "fly" mode. Additionally, based on known carriage position and velocity information, the master microprocessor determines the time at which the carriage will pass through the printing position. Based on that determination and the desired level of hammer energy, the master microprocessor determines when the hammer is to be fired.

The invention is preferably implemented by software executed by the master microprocessor. More particularly, in accordance with the present invention, the READY signal provided by the slave microprocessor acts as an interrupt to cause the master microprocessor to execute a programmed "fly" routine.

DESCRIPTION OF THE PREFERRED EMBODIMENT

Figure 1:
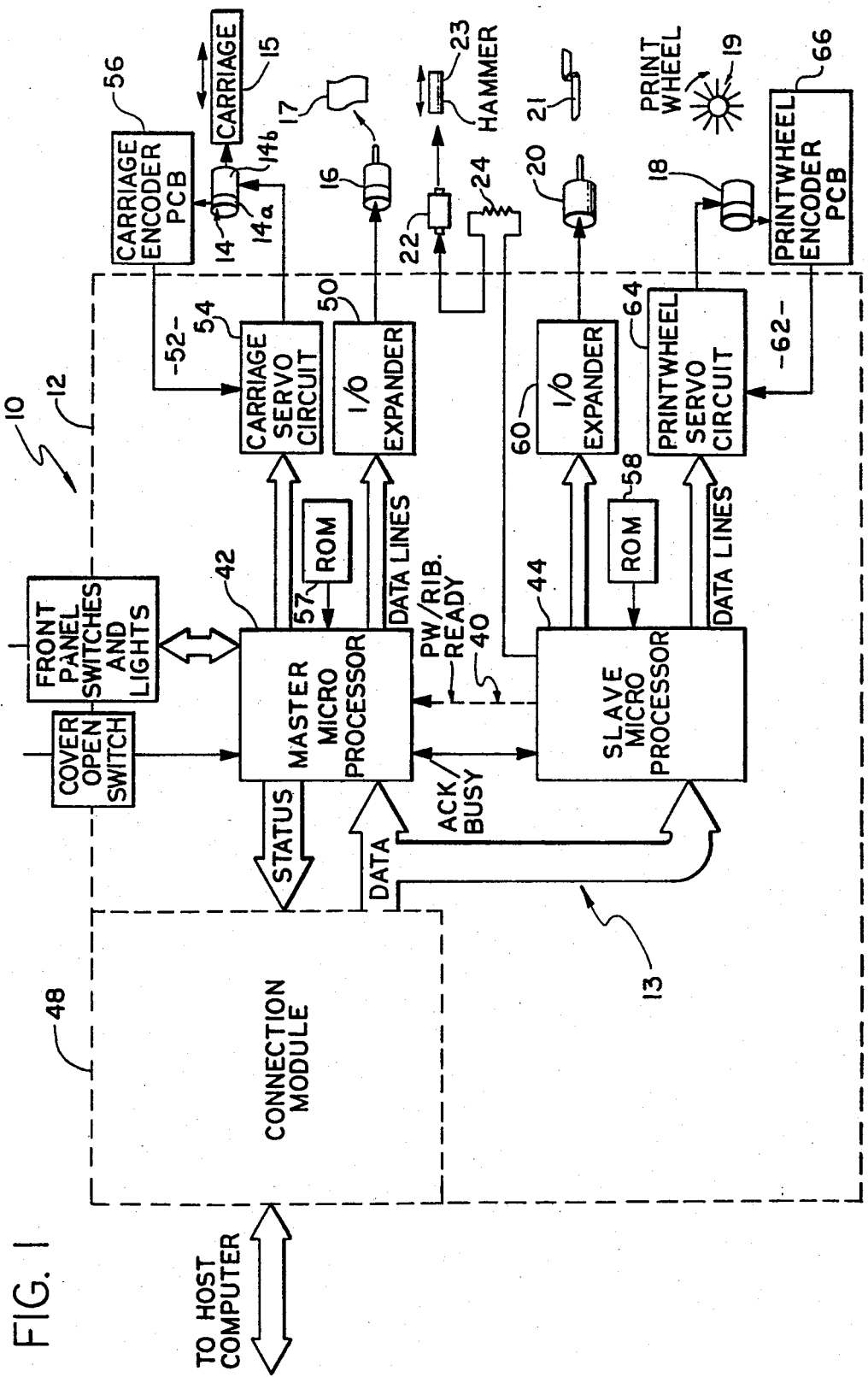
FIG. 1 is a block diagram of a prior art printer showing its control system that has been modified (as indicated in dashed lines) in accordance with the present invention

Attention is initially directed to FIG. 1 which schematically illustrates the primary components of a typical prior art serial fully formed character printer 10, i.e., a SPRINT 11 PLUS printer marketed by Qume Corporation.

The printer 10 of FIG. 1 is essentially comprised of a main printed circuit board ("PCB") 12 carrying control system electronics 13, a carriage motor/encoder 14 for moving a carriage 15, a paper feed motor 16 for advancing paper 17, a print wheel motor/encoder 18 for rotating a print wheel 19, a ribbon feed motor 20 for advancing a ribbon 21, a print hammer coil 22 for driving a print hammer 23 and a print hammer resistor 24 for controlling the impact intensity of hammer 23.

Prior to describing the control system depicted in block diagram form on the PCB 12 of FIG. 1, the overall functioning of the printer 10 will be briefly explained. As is well known, such printers typically include a carriage 15 mounted for linear movement parallel to a platen (not shown) and along a line to be printed. The carriage 15 carries a print assembly comprised of a rotatable print wheel 19 ("daisy wheel") and a hammer 23. The print wheel 19 typically comprises a hub having a plurality of spokes radiating outwardly therefrom, each spoke carrying a different fully formed character. The hammer 23 is mounted so that as the print wheel 19 is rotated, different characters sequentially pass in front of the hammer 23. The hammer coil 22 can be energized to impact the hammer 23 against the spoke positioned in front of it. As a consequence, the character carried by the spoke is printed on the paper 17 held against the platen.

Thus, in typical operation in order to print a line of characters the carriage 15 is stopped one character position at a time along the line to be printed, coming to rest at each position. During each carriage movement, the print wheel 19 is rotated and is brought to rest with the character to be printed positioned adjacent to the hammer 23. The hammer 23 is then actuated to impact the print wheel spoke against the paper 17. The control system depicted in block diagram form within dashed outline 12 of FIG. 1 controls the actuation and movement of all of the aforementioned electromechanical components.

It has been mentioned that typical operation involves stepping the carriage 15 one character position at a time. It should be understood, however, that the distance the carriage 15 moves is dependent upon operator defined instructions, e.g., a typical printer can print at character densities of 12 and 15 characters per inch. Morever, many printers enable the operator to define fractional carriage movements ½ and ¼ of a character spacing, as well as proportional spacing which provides different spacing for different characters.

The control system 12 depicted in FIG. 1 is substantially conventional and characteristic of the aforementioned SPRINT 11 PLUS printer except for the dashed line 40 whose function will be explained hereinafter. The control system includes a first microprocessor 42 which functions as a master and a second microprocessor 44 which functions as a slave. The master microprocessor 42 responds to commands communicated from a host computer (not shown) via a connection module 48. The commands from the host computer will typically comprise a character print command or a motion command (e.g., paper movement or carriage movement). In printing a line of characters, the host will issue motion commands to move the carriage 15 from position to position along the line and also print commands identifying the particular character to be printed at each position.

Master microprocessor 42 controls the paper feed motor 16 and the carriage motor 14 in response to motion commands. The paper feed motor 16 is controlled in open loop fashion via an I/O expander module 50. The carriage motor 14 is controlled via a servo loop 52.

The servo loop 52 includes a carriage servo circuit 54 and carriage encoder PCB (Printed Circuit Board) 56, in addition of course to the carriage motor/encoder 14. In typical operation of the servo loop 52, the microprocessor 42 selects the carriage motor direction (Carriage left or Right) and the servo mode of operation (Velocity Mode to move the carriage motor 14 or Position Mode to hold the motor 14 stationary). The microprocessor 42 then issues a Digital Velocity Command which defines the velocity at which the motor 14 should move. This digital command is converted in a digital to analog converter (not specifically shown) to produce a Velocity Command voltage. Additionally, the carriage encoder PCB 56 produces a true Velocity voltage (line b of FIG. 2) based on a sine wave signal (line c of FIG. 2) produced by an optical encoder 14a mounted on the shaft of the carriage motor 14b. The servo circuit 54 sums the Velocity Command voltage and the true Velocity voltage to produce a Difference voltage which is then amplified by an error amplifier to modify the motor speed. When the motor encoder 14a is rotating at the correct speed, the true Velocity voltage fed back to the servo circuit 54 will match the Command voltage.

The microprocessor 42 is able to precisely control the carriage motor velocity in accordance with any desired velocity profile by continually revising the Digital Velocity Command. These Digital Velocity Commands which thus define the velocity profile are either calculated or are accessed by microcomputer 42 from read only memory (ROM) 57. The servo loop 52 acts upon the motor 14 in accordance with the foregoing description to continually modify the true motor velocity to match the commanded velocity.

For high speed printer applications it is necessary that the servo loop 52 operate very rapidly and precisely. A particularly suitable servo system for controlling the carriage motor 14 is disclosed in pending U.S. application Ser. No. 554,421 filed Nov. 23, 1983 and assigned to the same assignee as the present application, which application is hereby incorporated by reference.

The slave microprocessor 44 controls the ribbon feed motor 20 in open loop fashion via an I/O expander module 60. Additionally, the microprocessor 44 is connected to the print hammer coil 22 to control when the coil 22 is energized to propel the hammer 23 for impacting. By controlling the current which is fed to the print hammer coil 22 via resistor 24, the impact intensity can be varied. That is, to produce print of substantially uniform density, it is necessary to impact large area characters with a larger force than small area characters. Impact intensity in the form of drive current duration information is obtained by microprocessor 44 from read only memory (ROM) 58.

Print wheel motor 18 is controlled by microprocessor 44 via a servo loop 62 which includes print wheel servo circuit 64, print wheel encoder PCB 66, and of course the print wheel motor/encoder 18. The servo loop 62 operates essentially identically to the aforedescribed servo loop 52.

The system of FIG. 1 as described thus far is conventional and is characteristic of the aforementioned SPRINT 11 PLUS, except for the dashed line 40 whose specific function will be described hereinafter.

Figure 2:
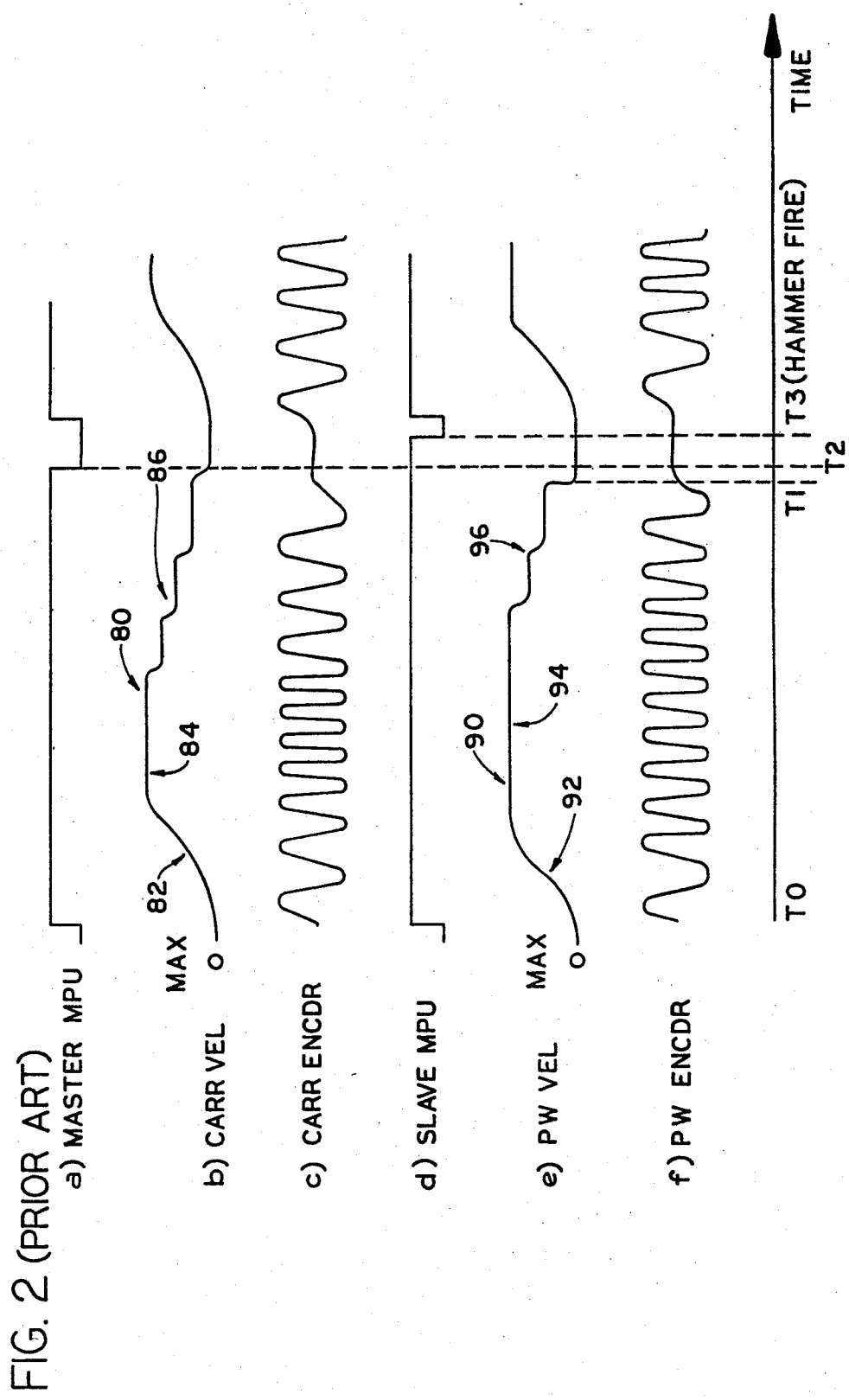
FIG. 2 is a timing chart depicting wave forms typically associated with a prior art printer control system.

Attention is now directed to FIG. 2 which comprises a simplified timing chart useful to explain the typical prior art operation of the printer 10 of FIG. 1. In executing a print command, as has been previously noted, both the carriage 15 and the print wheel 19 are moved to their new position and stopped prior to firing the hammer 23. It will be assumed in FIG. 2 that the print wheel 19 reaches its destination prior to the carriage 15 reaching its destination.

Line (a) of FIG. 2 depicts the master microprocessor 42 going Busy at time T0 to initiate the carriage positioning interval. Line (b) represents the velocity profile 80 of the carriage 15 in moving from one character position to the next. Note that the velocity profile 80 includes a first acceleration portion 82 in which the velocity ramps up from rest toward a maximum velocity value 84. The carriage velocity is maintained at this level 84 up to a predetermined distance from the destination position at which a deceleration portion 86 is initiated to slow the carriage 15 and enable it to come to rest at its destination at time T2. The master microprocessor Busy signal (line a) then goes low at T2.

Line (c) of FIG. 2 depicts the sine wave produced by the carriage encoder PCB 56. Note that the frequency is low at the beginning and increases during the acceleration portion 82 of the velocity profile 80 (line b). The frequency of the sine wave of line (c) is constant during portion 84 and then diminishes during the deceleration portion 86. Line (d) depicts the slave microprocessor Busy status. The slave microprocessor goes Busy at time T0. The print wheel velocity profile 90 is depicted in line (e) and is shaped similarly to the carriage velocity profile 80. It similarly includes an acceleration portion 92, a constant maximum velocity portion 94, and a stepwise deceleration portion 96, coming to rest at its destination at time T1. Line (f) depicts the sine wave produced by the print wheel encoder 66. With both the carriage 15 and print wheel 19 at rest, the hammer 23 is fired at time T3 and the slave microprocessor Busy signal (line d) goes low.

In the conventional operation of the printer 10 of FIG. 1, as depicted in FIG. 2, a substantially fixed time interval is required to displace the carriage 15 from one fixed-pitch character position to the next. In contrast, the duration required to move the print wheel 19 from rest to its destination position is variable and depends upon the particular character being selected. Thus, the print wheel may have to rotate through as little as 0 degrees or as much as 180 degrees. The amount of print wheel rotation required in FIG. 2 determines the speed at which printing can be accomplished since it is necessary that the print wheel 19 come to rest at its destination position before firing the hammer 23.

Whereas the printer 10 of FIG. 1, when conventionally operated, requires that both the carriage 15 and print wheel 19 come to rest prior to printing, the present invention is capable of printing "on the fly," i.e., with the carriage 15 in motion. As will be described in connection with FIG. 3, in accordance with the present invention the carriage 15 is not required to stop at each character position. Rather, if when the carriage 15 approaches the character position, it appears that the print wheel 19 (and ribbon 21) will soon be coming to rest, then the carriage velocity is maintained with the hammer 23 impacting the print wheel 19 while the carriage 15 is in motion. In order to maintain high quality printing in accordance with the invention, it is preferable to use a light weight hammer 23 having a relatively low mass and a relatively high velocity to reduce variations in the hammer flight resulting from fluctuations in hammer energy and to minimize the time the print wheel 19 and ribbon 21 are actually in contact with the paper 17 (the former will affect the horizontal registration of the printed character, the latter, its sharpness).

Figure 3A:
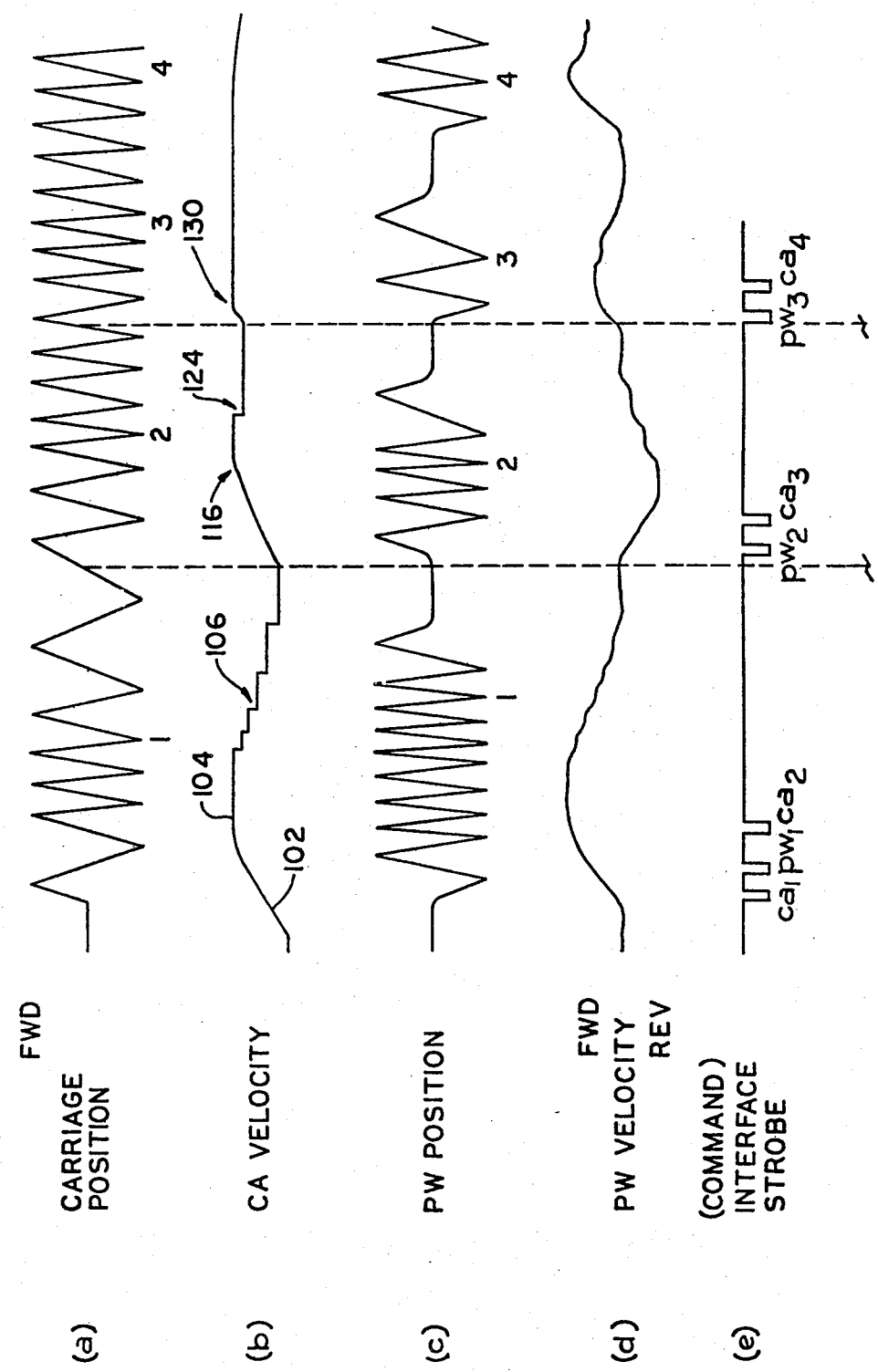
FIG. 3 (comprising FIGS. 3A and 3B) is a timing chart characteristic of operation in accordance with a preferred embodiment of the present invention.
Figure 3B:
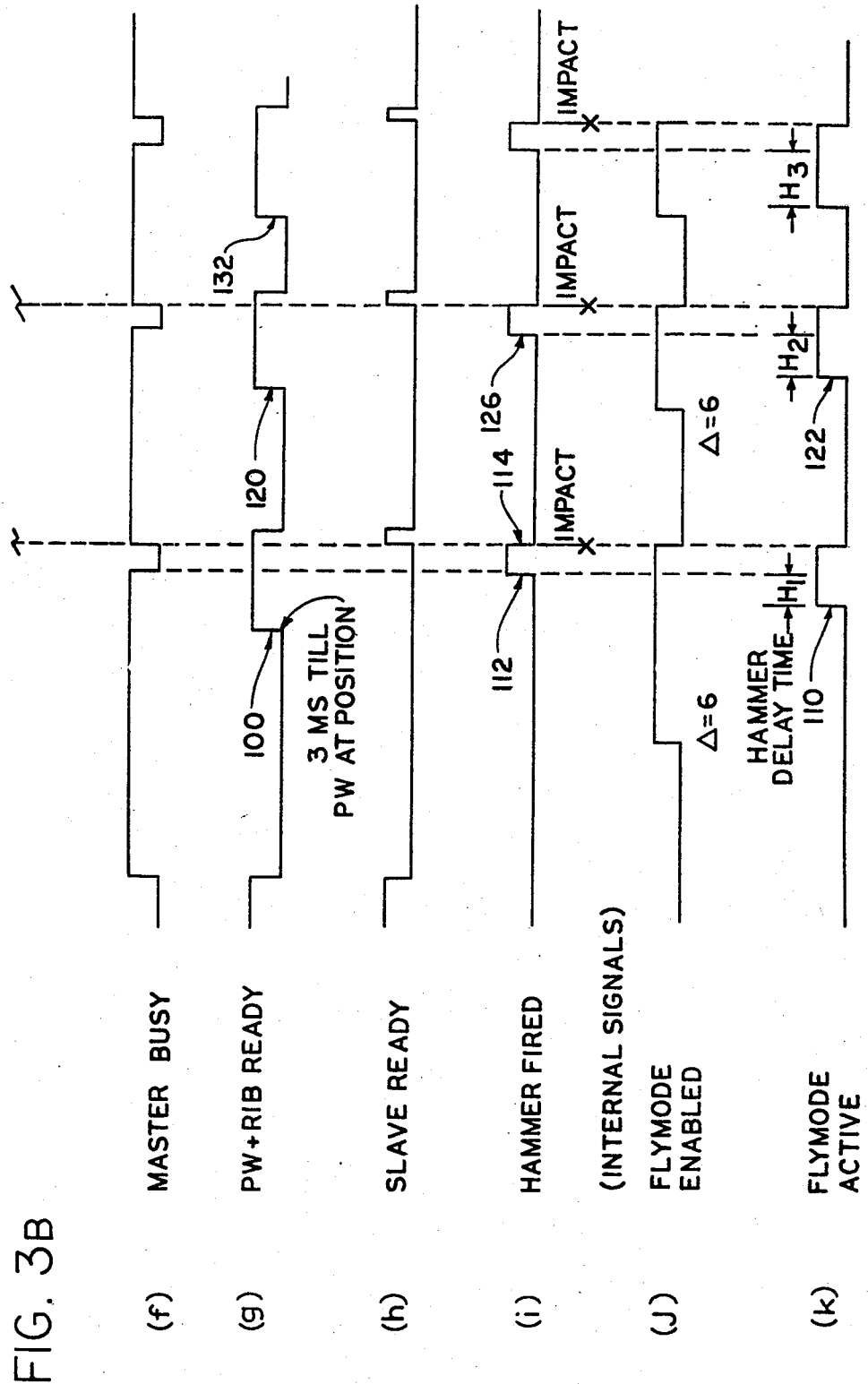

Attention is now directed to FIG. 3 (comprising FIGS. 3A and 3B) which depicts a timing chart covering three successive exemplary character printing intervals 1, 2, and 3 respectively representing relatively long, moderate and short times required to orient the print wheel 19. FIG. 3 also depicts a portion of a succeeding printing interval 4.

As previously mentioned, the printer in accordance with the invention is operated so as to minimize the starting and stopping of the carriage 15. In order to do this, the print wheel 19 and ribbon 21 are monitored during each character printing interval (1, 2 etc) and a READY signal (g) is generated at a fixed interval (e.g., 3 milliseconds) prior to their coming to rest. In most cases, print wheel positioning takes longer than ribbon positioning. It is typical to use a single strike ribbon which requires that the ribbon 21 be moved by a distance equal to the width of a character. Concurrently, the print wheel must be rotated by a variable amount anywhere from 0 degrees to 180 degrees. Thus, the time for ribbon positioning will be constant, while that for print wheel positioning will be variable. For purposes of explanation herein it will be assumed that ribbon positioning is completed faster than print wheel positioning—the more complicated case.

The master microprocessor 42 is operated to establish a carriage velocity profile (line (b) of FIG. 3) which would enable the carriage 15 to decelerate in stepwise fashion to rest at the proper printing position during each printing interval. However, the READY signal (line (g) of FIG. 3) is constantly monitored during the latter portion of each interval to determine whether further carriage deceleration and eventually complete stopping of the carriage 15 will be required. If the READY signal occurs sufficiently early, then all deceleration will be inhibited permitting the carriage 15 to fly or coast at its normal maximum velocity through the printing position.

The READY signal (line (g) of FIG. 3) is generated based upon the actual position of the print wheel 19, and indicates that a maximum of about 3 milliseconds is required to complete print wheel positioning. Three milliseconds is less than the time that would be required for the carriage 15 to coast at constant velocity from any point in the deceleration portion of a normal preprogrammed velocity profile to its destination position where the character is to be printed. For maximum deceleration the deceleration force should theoretically be constant and the carriage velocity is therefore roughly proportional to the destination distance; thus the optimum advance displacement in time of the READY signal relative to the final positioning of the print wheel is essentially independent of the actual carriage velocity during the deceleration portion 106 of the velocity profile (b).

Upon recognition of the READY signal, the master microprocessor 42 thereafter operates the carriage 15 in the "fly mode" to maintain the carriage motion at constant speed until the current target or printing position is reached. Further, the master microprocessor 42 performs a table look up operation to determine the time delay until the hammer 23 should be fired. This time delay is determined based upon the known position and constant velocity of the carriage, as well as any intentional variation in hammer energy.

Now considering FIG. 3 in greater detail, it should be noted that lines (a) through line (k) thereof depict the following:

Line (a)—carriage encoder 56 output, depicted for illustrative purposes as a simple triangular wave form;
Line (b)—carriage velocity profile;
Line (c)—print wheel encoder 66 output, depicted for illustrative purposes as a simple triangular wave form;
Line (d)—print wheel velocity profile;
Line (e)—carriage and print wheel strobe signal;
Line (f)—master microprocessor status signal;
Line (g)—print wheel (ribbon) READY signal;
Line (h)—slave microprocessor status signal;
Line (i)—hammer fired pulses;
Line (j)—Fly Mode Enable signal; and
Line (k)—Fly Mode Active signal.

In order to understand the operation of an embodiment of the invention, consider initial operation as depicted during printing interval 1 of FIG. 3. As has been mentioned, the print wheel READY signal 100 (line g) is first assumed to occur relatively late in the printing interval. In that case, prior to the READY signal occurring, the carriage velocity (line b) will have experienced a period of acceleration 102, a period of maximum velocity 104, and a period of deceleration 106. As previously noted, if a timely READY signal does not occur within a printing interval, then indeed the carriage 15 is fully decelerated to cause it to come to rest at the proper printing position. In printing interval 1 depicted in FIG. 3, note that the carriage velocity has decelerated through several steps 106 prior to the READY signal 100 occurring.

If the Fly Mode has been enabled (line j), to be discussed further in connection with the flow charts of FIG. 4, the master microprocessor 42 will respond to the READY signal 100 to activate the Fly Mode at time 110. Activation of the Fly Mode 110 inhibits any further deceleration of the carriage velocity. The master microprocessor 42 then determines a Hammer Time Delay (depicted by the interval H). This Hammer Time Delay is based upon the known constant carriage velocity and the desired impact intensity and is determined by the microprocessor 42 executing a table lookup operation. At the expiration of the Hammer Time Delay, the hammer 23 is fired at 112, impacting the character against the paper 17 a short time later at 114. Note that at this time the carriage velocity (line b) in printing interval 1 is somewhat greater than zero, meaning, of course, that the necessity of stopping the carriage 15 has been avoided. Moreover, when initiating the subsequent printing interval 2, the carriage 15 will be accelerated from a non-zero velocity and will thus reach its maximum velocity 116 earlier. Accordingly, the average velocity of the carriage 15 is increased both by avoiding unnecessary deceleration from the coasting velocity to rest and by avoiding unnecessary acceleration from rest to the coasting velocity.

Printing interval 2 in FIG. 3 assumes that the READY signal 120 occurs earlier than in interval 1 thereby causing the Fly Mode to be activated earlier at 122 (line k). As a consequence, the deceleration 124 of the carriage 15 (line b) is inhibited earlier, thereby enabling the carriage 15 to move through the printing position at a higher coasting velocity than during printing interval 1. Note that the Hammer Delay Time $H_2$ depicted in printing interval 2 is different from the interval $H_1$ depicted for printing interval 1. This delay time depends upon the hammer velocity and the distance that the carriage 15 still has to traverse between the time the Fly Mode is activated (line k) and the time the carriage 15 reaches the printing position. At the end of the Delay Time $H_2$ in interval 2, the hammer 23 is fired at 126.

As is illustrated, the carriage 15 then enters printing interval 3 at a higher velocity than it entered printing interval 2. As a consequence, the carriage 15 is able to accelerate to its maximum velocity 130 in a very short time. Despite the relatively high velocity of the carriage 15 in interval 3, it is assumed that the READY signal (line g) 132 occurs sufficiently early in the interval to avoid any deceleration of the carriage. As a consequence, the carriage 15 is depicted as entering printing interval 4 at its maximum velocity. It should be appreciated therefore that operation of the printer 10 in accordance with the present invention and as depicted in FIG. 3 enables printing frequently to be effected on the fly at various optimal coasting velocities thereby enabling higher average printing speeds to be achieved. Perhaps even more significantly, however, by avoiding the necessity of completely starting and stopping the carriage 15 at every printing position, not only are settling times eliminated, but also associated mechanical stresses are reduced thereby enhancing the reliability and reducing the vibration and acoustic noise associated with the printer operation.

Figure 4A:
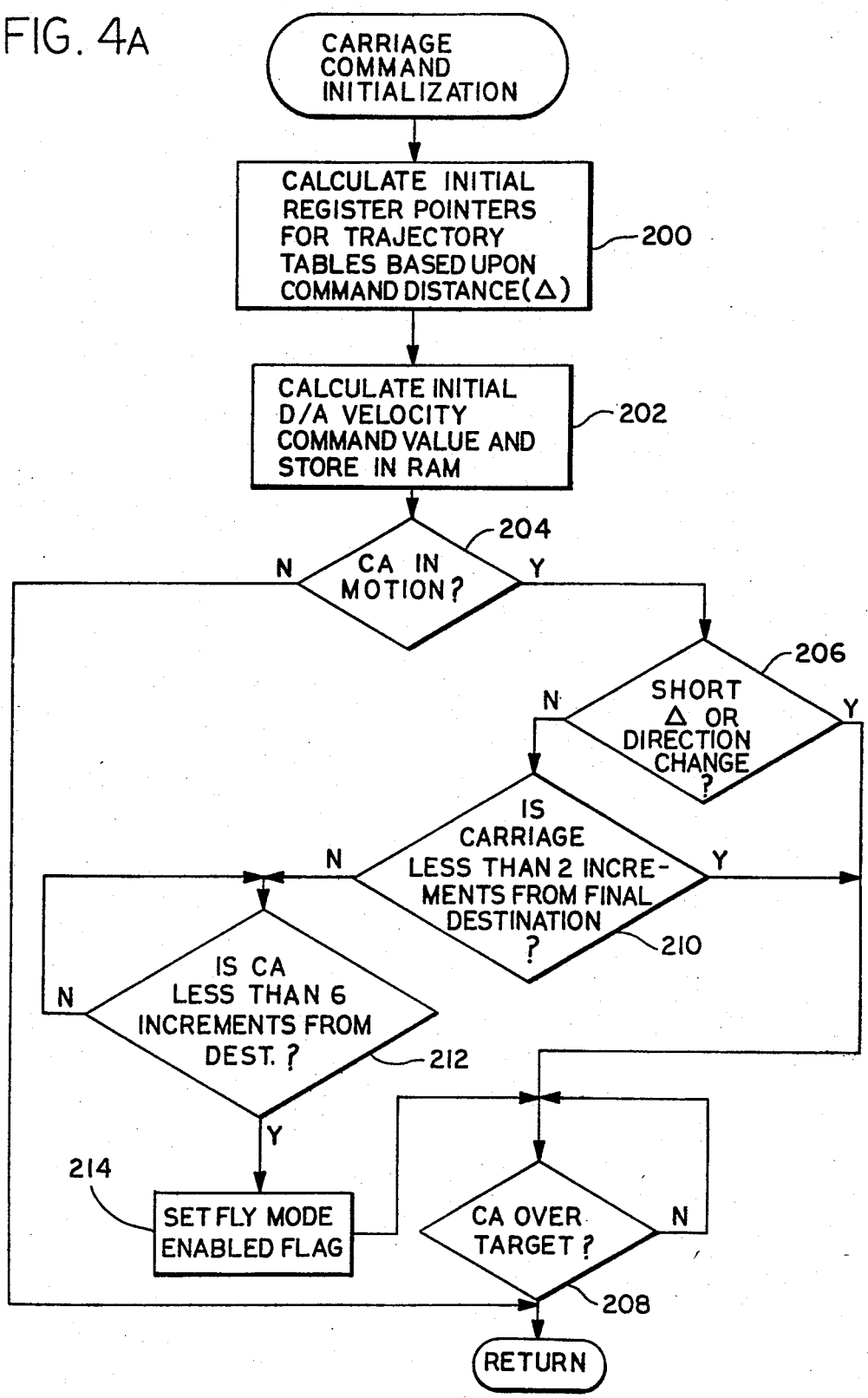
FIGS. 4A, 4B and 4C comprise flow charts describing the operation of the master microprocessor in accordance with the preferred embodiment.
Figure 4B:
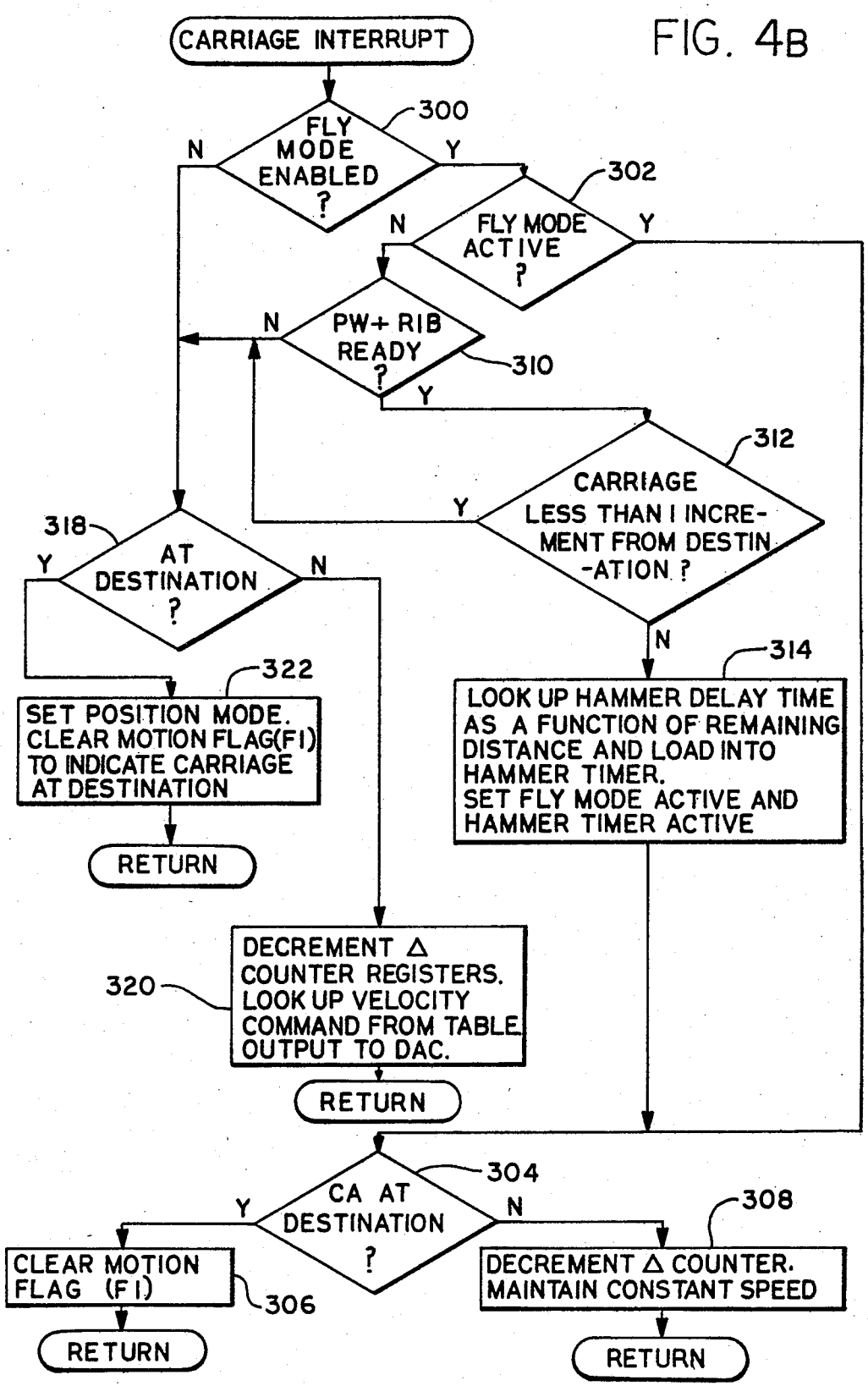
Figure 4C:
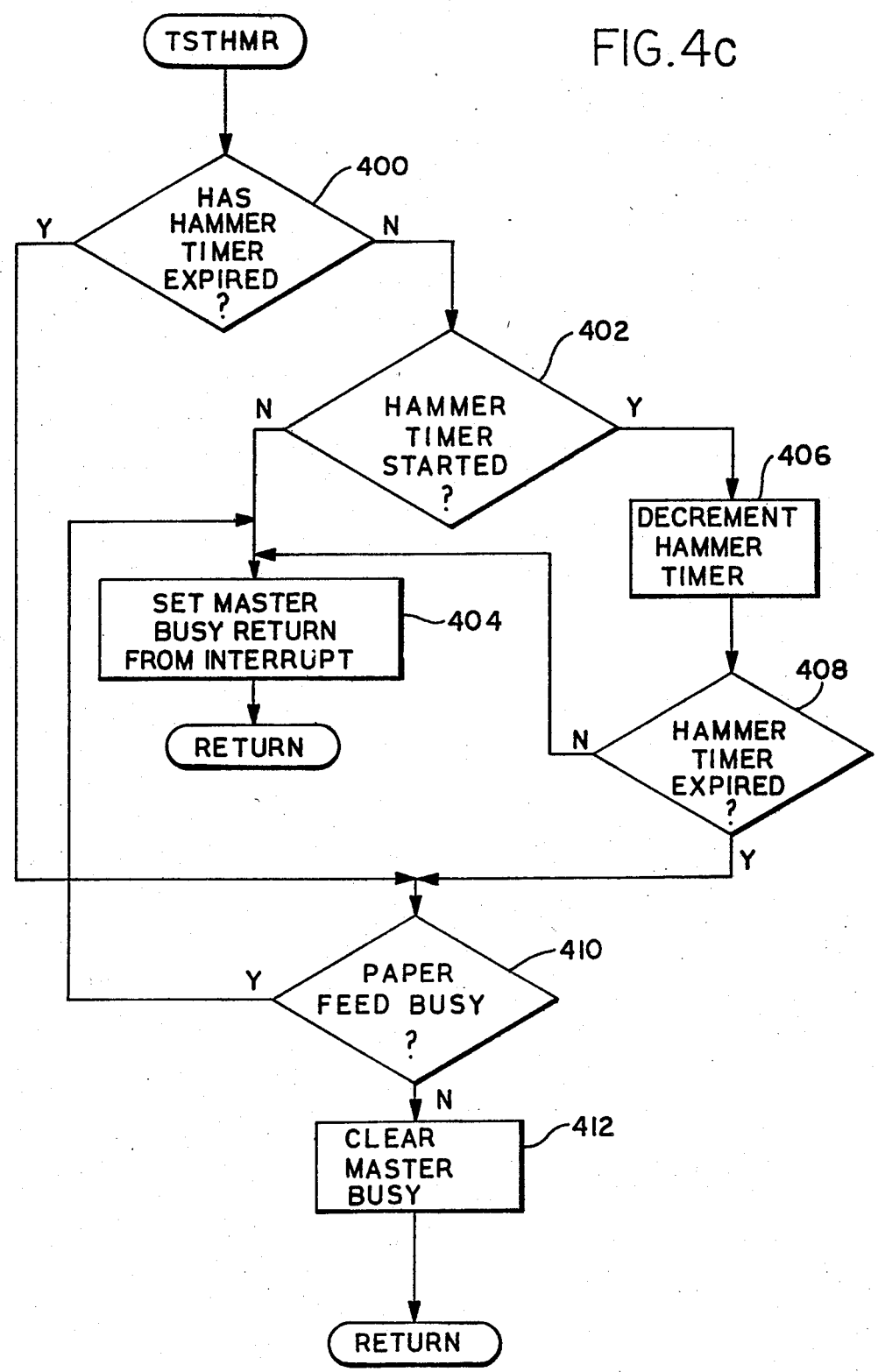

Attention is now directed to FIGS. 4A, B, and C which depict, in flow chart form, that portion of the master microprocessor 42 operation particularly relating to the innovative aspects of the present invention. FIG. 4A depicts a portion of the Carriage Command Initialization routine. FIG. 4B depicts a portion of the Master Carriage Interrupt routine. FIG. 4C depicts a portion of the Hammer Timer Interrupt routine. The portions of the master microprocessor operation depicted by FIGS. 4A, B and C, of course, represents only a small portion of the overall operation and flow chart of the master microprocessor. Aside from those portions depicted by FIGS. 4A, B and C, the master microprocessor 42 operates in a substantially conventional manner, as for example, in the manner characteristic of the aforementioned SPRINT 11 PLUS.

In the Carriage Command Initialization routine depicted in FIG. 4A, the required pointers to the relevant entries in a predetermined Trajectory Table are initially calculated based upon the command distance, i.e., the distance the carriage 15 must travel to the next or destination ("target") printing position. This operation is designated by block 200. The corresponding digital values are calculated in block 202 and stored in the memory (not shown) of master microprocessor 42. When the command is ready for execution, these are then converted in a conventional digital to analog converter included within the carriage servo circuit 52.

Operation then proceeds to decision block 204 to determine whether the carriage 15 is already in motion, i.e., is a previously processed (initialized) carriage command currently being executed? If no (branch "N"), the stored trajectory information is used to initialize a conventional Carriage Motion subroutine which will implement the commanded carriage motion as the current command, and the trajectory information for the next command is then calculated (blocks 200 and 202). If yes (branch "Y"), operation proceeds to decision block 206 which in effect looks ahead to determine whether this next carriage command (the carriage command that is now in the process of being initialized) involves a "short" command distance (for example, less than 7 increments or 7/120" of carriage movement) or a direction change, relative to the current carriage command (the carriage command currently being executed). This is necessary because either of these effectively prevent the Fly Mode from being beneficial during the execution of the current carriage command. A "short" distance involves a different type of velocity profile having fewer deceleration increments and a lower maximum velocity and would result in an overshoot of the next target in the event the carriage 15 were permitted to fly over the current target at the velocities that are typically associated with the present invention. A change in direction will require the carriage 15 to stop in any event.

Thus, an affirmative determination in decision block 206 leads directly to decision block 208 which queries whether the carriage 15 is over the current target. If not, the master microprocessor enters an iteration loop during which it responds to carriage interrupts processed by the above-mentioned conventional Carriage Motion routine until the carriage 15 is finally stopped over the target and the hammer 23 is fired in the conventional manner. Note that a Carriage Motion flag (flag F1) is set to equal 1 when the above-mentioned Carriage Motion subroutine commences to execute a current command and is reset to equal 0 when the carriage 15 is over the target and the current command has thus been fully executed.

In decision block 206, if the next command neither involves a short command distance or a change in direction, then operation proceeded to decision block 210. Here a determination is made as to whether the carriage 15 is already less than 2 encoder increments (typically 1/120" each) from it current target destination.

If yes, the carriage 15 is either already stopped or is only one increment away from being stopped, and the carriage 15 will not be moving with sufficient velocity to save a significant amount of time, even if the ribbon 21 could be advanced in time to permit the Fly Mode to be activated. Thus, again the Fly Mode is not especially beneficial and operation moves to decision block 208. However, if decision block 210 generates a negative response, operation proceeds to decision block 212. Decision block 212 inquires whether the carriage 15 is less than 6 increments from its final destination or target. If the response is negative, then the microprocessor 42 enters an iteration loop in which it continues to to respond to Carriage Interrupt signals as each increment of carriage motion occurs, as the carriage 15 is a relatively great distance from its target and of course is still in motion. When the carriage 15 is within 6 increments from its target destination and is therefore past any high speed slew portion and about to enter the programmed stepwise deceleration portion (eg, portion 106) of the relevant variable velocity profile, operation proceeds to block 214 in which the Fly Mode is enabled. It will be recalled that the Fly Mode Enabled signal is depicted in line j of FIG. 3.

As will be recalled, after the Fly Mode is enabled, the Fly Mode can be activated in response to the occurrence of the print wheel READY signal. If the print wheel READY signal occurs before the Fly Mode is enabled, then activation of the Fly Mode is deferred until the Fly Mode is enabled. In order words, the Fly Mode is activated only when the carriage 15 is within 6 increments of its target and the carriage 15 has entered the controlled portion of its programmed carriage velocity profile. The Carriage Command and Initialization routine depicted in FIG. 4A represents a portion of a larger routine. When the initialization portion of the routine is completed, the master microprocessor performs background processing and also responds to various interrupts in addition to shown in FIGS. 4B and 4C which respectively depict Carriage Interrupt and Timer Interrupt routines.

Before proceeding with an explanation of the Carriage Interrupt Routine depicted in FIG. 4B, it should be understood that a full character width movement at 10 characters per inch (Pica pitch) typically represents 12 increments of carriage encoder 14a, and it will be recalled from FIG. 4A that the Fly Mode is enabled only when the carriage 15 is within 6 increments during carriage motion. Thus, the Carriage Interrupt Routine (FIG. 4B) of the master microprocessor checks to see if the Carriage Command Initialization routine of FIG. 4A has already enabled the Fly Mode for the current carriage motion command. If the Fly Mode was enabled, the Carriage Interrupt routine then checks for the READY signal (line g of FIG. 3). If ready, further deceleration of the carriage 15 is inhibited. A Hammer Delay is then determined as a function of the remaining time required for the carriage 15 to reach the target. The Hammer Delay thus depends upon the carriage velocity when the Fly Mode is activated as well as the remaining distance to target. The determined Hammer Delay time is then loaded into a register to be subsequently used by the Hammer Timer Interrupt routine (FIG. 4C).

The aforedescribed operational sequence is implemented in accordance with the flow chart of FIG. 4B wherein decision block 300 determines whether the Fly Mode has been enabled. If yes, then decision block 302 determines whether the Fly Mode is Active. If yes, then operation proceeds to the decision block 304 which determines whether the carriage 15 has yet arrived at its target destination. If yes, then the aforementioned Motion Flag F1 is reset (cleared to zero) in block 306. If the decision out of block 304 is negative, then the distance or delta counter is decremented but the Motion Flag remains set and the carriage velocity is maintained constant (block 308); meanwhile, control is returned to background processing until the next carriage interrupt is processed.

Returning to decision block 302, if the Fly Mode is not yet Active, operation proceeds to decision block 310 which determines whether the print wheel and ribbon READY signal has yet occurred. If yes, operation proceeds to decision block 312 which determines whether the carriage 15 is already less than one increment from its destination. If the response is negative, operation proceeds to block 314. Block 314 causes the Hammer Delay time to be determined from a lookup table as a function of the remaining distance the carriage 15 has to move. In addition, this Hammer Delay time is loaded into a Hammer Timer and flags for Fly Mode Active and Hammer Timer Active are set. Operation then proceeds to Carriage at Destination decision block 304.

Consider now that the decision out of block 310 was negative, i.e., the print wheel and ribbon READY signal had not yet occurred, or that decision block 312 had determined that when it occurred the carriage 15 was less than one increment from its target destination. In either event, operation proceeds to decision block 318 which determines whether the carriage 15 is yet at its destination. If no, then the distance or delta counter is decremented and a velocity command is extracted from a lookup table and supplied to the digital to analog converter associated with the carriage servo circuit 54. This is accomplished in block 322. It should be recognized that block 320 is entered only when the Fly Mode is not Active and the master microprocessor is still controlling the carriage velocity in accordance with a programmed variable velocity profile. This is in direct contrast to the situation shown on the right side of the Figure in which the Fly Mode had been activated and block 308 is entered to maintain a constant carriage velocity.

Returning now to decision block 318, if the carriage 15 has reached its destination, then operation proceeds to block 322 in which operation of the carriage servo loop 52 is switched to a position or detent mode to hold the carriage 15 at the target destination. Block 322 establishes the position mode and clears the aforementioned Motion flag F1 to indicate that the carriage 15 has completed its required motion relative to the current target destination.

FIG. 4C depicts the Hammer Timer Interrupt routine which occurs every 100 microseconds during carriage motion. The hammer interrupt routine monitors a Hammer Timer register (not shown) and when Active, decrements the register at every interrupt to provide a programmable time interval. When the Hammer Timer register counts down to zero, then the Master Busy signal (line f) of FIG. 3 is cleared enabling the slave microprocessor 44 to fire the hammer 23.

The Hammer Interrupt routine begins with decision block 400 which determines whether the count in the Hammer Timer register has expired, i.e., decremented to zero. If not, operation proceeds to decision block 402 where it is determined whether the Hammer Timer decrementing has yet begun. If not, that is, if the Hammer Delay Time interval set in block 314 has not yet commenced, the Master Busy signal (line f of FIG. 3) is set, or maintained set, in block 404 and the master microprocessor 42 returns to background processing.

On the other hand, if decision block 402 determines that the Hammer Timer has started, operation proceeds to block 406 which decrements the Hammer Timer. Then operation proceeds to decision block 408 which determines whether the Hammer Timer has expired. If not, then again block 404 is executed to maintain the master Busy signal high. On the other hand, if the response to decision block 408 is affirmative, then operation proceeds to block 410 which determines whether the paper feed is Busy. If not, then the Master Busy signal is cleared enabling the slave microprocessor 44 to fire the hammer 23 (block 412). If decision block 410 determines that the paper feed system is busy, then the hammer 23 is not fired, that is block 412 is not executed. Rather, operation returns to block 404.

If the initial decision block 400 provided an affirmative response, i.e., that the Hammer Timer had already expired, then operation would have proceeded directly to decision block 410.

From the foregoing, it should now be understood that a printer implemented in accordance with the teachings herein enables printing to occur at higher speed as a consequence of avoiding, whenever possible, a stopping of the carriage 15 at the printing position. Instead, the carriage velocity is controlled during each character printing interval in accordance with a velocity profile which would enable it to decelerate and stop at the target destination. However, during the carriage motion, the print wheel and ribbon 21 are monitored and if they produce a READY signal, as aforedescribed, then any further carriage deceleration is inhibited and a hammer fire time determined to enable the carriage 15 to coast at a constant velocity through its target destination with the print wheel being impacted on the fly. In addition to enhancing printer speed, printer reliability is also enhanced and vibration and acoustic noise is reduced.

What is claimed is:

1. A serial character printer comprising:
   carriage means mounted for movement along a line to be printed comprised of multiple character positions;
   hammer means mounted on said carriage means;
   character means, defining an ordered series of different characters, mounted on said carriage means and movable so as to selectively position any one of said characters adjacent to said hammer means;
   means for sequentially supplying print commands, each identifying the next character position at which a character is to be printed, and the particular character to be printed at each next character position;
   first motive means responsive to each print command for moving said carriage means in accordance with a selected non-constant velocity profile selectively including an acceleration portion, a constant velocity portion, and a deceleration portion configured to enable said carriage means to stop at the next character position identified by said command;
   second motive means responsive to each print command for moving said character means and stopping at a destination position whereat the character identified by said command is held stationary in position adjacent to said hammer means;
   character control means responsive to said character means movement for generating a READY signal prior to said character means arriving at said next character position;
   carriage control means responsive to said READY signal for causing said first motive means to be no longer responsive to said selected non-constant velocity profile but rather to inhibit further deceleration of said carriage means to thereby enable said carriage means to move past said next character position at a substantially constant velocity without stopping thereat; and means for actuating said hammer means prior to said carriage means moving past said next character position to thereby impact said character means at said next character position.

2. The printer of claim 1 including master microprocessor means for generating carriage means velocity commands; and wherein
said first motive means includes servo circuit means responsive to said carriage velocity commands and the actual velocity of said carriage means for moving said carriage means.

3. The printer of claim 2 wherein said master microprocessor means includes program means for generating velocity commands to define said velocity profile.

4. The printer of claim 3, wherein said program means is responsive to said character means for determining a hammer delay interval; and wherein
said means for actuating said hammer means is responsive to the expiration of said hammer delay interval.

5. A serial character printer comprising:
a carriage mounted for movement along a line to be printed comprised of multiple character positions;
hammer means mounted on said carriage;
character means, defining an ordered series of different characters, mounted on said carriage and movable so as to selectively position any one of said characters adjacent to said hammer means;
means for sequentially supplying print commands, each identifying the distance the carriage is to be moved to the next character position and the particular character to be printed at that next character position;
processor means responsive to each print command for generating velocity commands to move said carriage in accordance with a selected velocity profile selectively including a deceleration portion for decelerating said carriage to rest at said next character position;
means responsive to each print command for moving said character means and stopping at a destination position whereat the character identified by said command is held stationary in position adjacent to said hammer means;
said processor means including means responsive to each print command for enabling a carriage fly mode in the event the distance the carriage is to be moved exceeds a certain amount:
means for monitoring said character means to generate a READY signal a certain interval prior to said character means reaching said destination position; and wherein
said processor means includes program means responsive to said READY signal while said carriage fly mode is enabled for inhibiting further carriage deceleration to thereby cause said carriage to move through said next character position at substantially the same velocity with which it was moving at the time said READY signal was generated without stopping thereat.

6. The printer of claim 5 wherein said processor means includes
means responsive to said READY signal for determining a hammer delay interval; and
means for actuating said hammer means at the expiration of said hammer delay interval.

7. The printer of claim 5 wherein said processor means comprises a microprocessor and stored program means for controlling said microprocessor.

8. The printer of claim 6 wherein said means responsive to said READY signal includes
interrupt means for interrupting said stored program means to inhibit said carriage deceleration and to additionally determine a hammer delay interval; and
means for actuating said hammer means at the expiration of said hammer delay interval.

9. The printer of claim 5 further including:
a carriage motor coupled to said carriage;
encoder means for producing a signal representative of actual carriage velocity; and
servo circuit means responsive to said velocity commands and said encoder means signal for controlling said carriage motor.

10. The printer of claim 5 wherein said character means comprises a print wheel mounted for rotation about its axis.

11. The printer of claim 10 further including:
a print wheel motor coupled to said print wheel;
print wheel encoder means for producing a signal representative of actual print wheel position; and
print wheel servo circuit means responsive to said print commands and said print wheel encoder means signal for controlling said print wheel and for generating said READY signal.

12. A method of operating a printer which includes a carriage driven by a first motor and a print wheel carried by said carriage and driven by a second motor, in order to print onto a print medium without regularly stopping said carriage, said method comprising the steps of;
moving said carriage from one position to a subsequent position in accordance with a velocity profile including a deceleration portion for stopping said carriage at said subsequent position;
rotating said print wheel to a destination orientation whereat a selected character can be printed;
monitoring the rotation of said print wheel so as to produce a READY signal a predetermined time interval prior to said print wheel arriving at said destination orientation;
modifying said carriage movement in response to said READY signal to inhibit further deceleration of said carriage to cause said print wheel to move past said subsequent position at a substantially constant velocity corresponding to the carriage velocity when said READY signal occurred;
determining when said carriage will move past said subsequent position; and
impacting said print wheel against said print medium concurrent with said carriage moving past said subsequent position.

13. The method of claim 12 wherein said step of moving said carriage includes;
operating a microprocessor in accordance with a stored program to generate successive velocity commands for a velocity servo loop, and defining said velocity profile as a plurality of steps each having an associated command velocity and each associated with a different increment of carriage movement within a carriage command interval.

14. The method of claim 13 wherein said step of modifying said carriage movement includes interrupting said stored program at the commencement of the next said increment of carriage movement subsequent to the recognition by said monitoring means of said predetermined time in advance of when said print wheel will move past said subsequent position and continuing to use the command velocity associated with the immediately prior increment of carriage movement until said carriage is past said subsequent position.

* * * * *